Patented Nov. 25, 1952

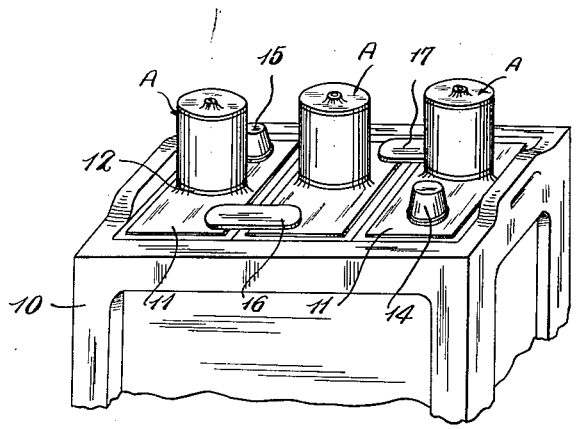
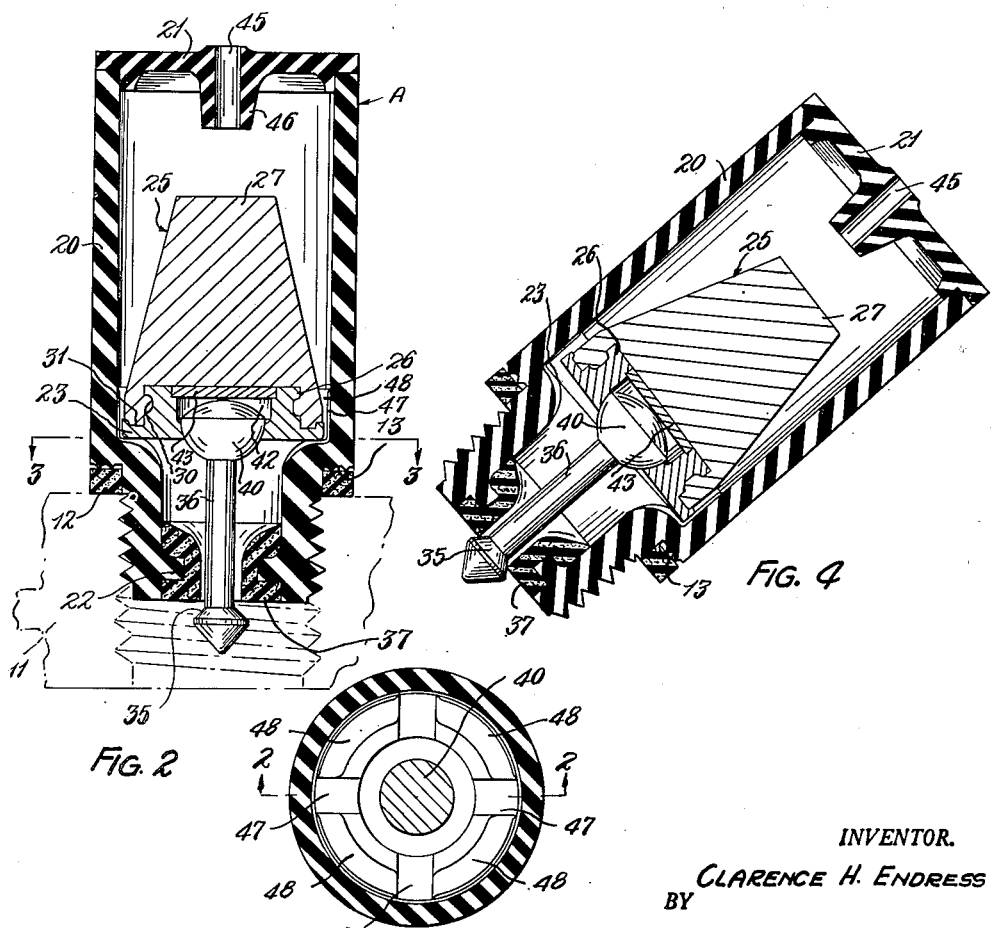

2,619,102

UNITED STATES PATENT OFFICE 2,619,102

BATTERY NONSPILL VENT PLUG

Clarence H. Endress, Cleveland Heights, Ohio, assignor to Willard Storage Battery Company, Cleveland, Ohio, a corporation of West Virginia Application January 11, 1946, Serial No. 640,468

2 Claims. (Cl. 137—43)

The present invention relates to a non-spill vent for a device containing liquid requiring venting and which may be tilted temporarily in such a manner that it cannot be left permanently open without the liquid spilling out. More particularly, the invention relates to a non-spill vent for a storage battery intended to be used on an airplane and the like. When devices of the character referred to are temporarily tilted and the vents closed, a certain amount of pressure usually builds up within the device, which pressure tends to hold the valve of the vent closed when the device is restored to normal position, and the principal object of the present invention is the provision of a novel and improved, non-spill vent for a device of the character referred to, the valve of which can be readily opened against pressure after having been temporarily closed.

Another of the objects of the invention is the provision of a novel and improved, non-spill vent of the character referred to wherein the vent passage is closed by a valve operatively connected to and actuated by a weight located thereabove upon the device being tilted a predetermined amount from normal position, which valve is so constructed and arranged that it will seat properly when the device is tilted and will readily open upon the device being restored to normal position even though it may be subjected to considerable pressure within the device.

The invention resides in certain constructions and combinations and arrangements of parts, and further objects and advantages thereof will be apparent to those skilled in the art to which the invention relates from the following description of the preferred embodiment of the invention hereinafter described with reference to the accompanying drawings forming a part of this specification in which similar reference characters designate corresponding parts and in which:

Fig. 1 is a perspective view of the upper part of a three-cell storage battery, each cell of which is provided with a closure plug for the filler opening thereof, which closure plugs embody the present invention;

Fig. 2 is a longitudinal sectional view, approximately on the line 2—2 of Fig. 3, of one of the closure plugs shown in Fig. 1;

Fig. 3 is a sectional view on the line 3—3 of Fig. 2; and

Fig. 4 is a view similar to Fig. 2 but showing the vent plug tilted to close the vent passage therethrough.

While it is to be understood that the invention is susceptible of general application and may be embodied in different structures, it is particularly applicable to storage batteries and is here shown as embodied in a plug or cap for the filler opening of a conventional storage battery. Alternatively the invention may be incorporated in the cell cover or any other suitable part of the battery as distinguished from the filler plug or cap.

As previously stated, the battery shown is of commercial construction and will not be described in detail. Suffice it to say that it is of the three-cell type and includes a case 10 provided with suitable chambers for receiving the cells, electrolyte, etc., which chambers are closed by the cell covers 11. Each of the covers 11 is provided with a filler opening normally closed by a removable plug or cap, designated generally by the reference character A. The plugs A may be secured to the cell covers 11 in any suitable manner. As shown, the lower ends of the plugs are of reduced size, cylindrical in shape, and externally threaded for engagement with internal threads in the filler openings. Rubber washers 12 interposed between shoulders 13 formed on the plugs by the reduction in size referred to and the cell covers prevent leakage of the electrolyte around the plugs. The reference characters 14, 15 indicate the terminal posts of the battery and the reference characters 16, 17 the connector straps.

Each of the plugs A, all of which are alike, comprises a body assembly including a tubular member 20, circular in cross-section and of reduced size at its lower end forming the shoulder 13 previously referred to. The upper end of the member 20 is provided with a disk-like member 21 fixedly secured thereto after the weight or weight assembly and valve, etc., hereinafter referred to, are assembled in the member 20. The members 20, 21 are preferably made of an acid-resistant plastic or the like, such as polystyrene, hard rubber, etc., and the disk 21 may be cemented to the member 20, if desired. Alternatively the disk 21 may be detachably connected to the member 20 in a suitable manner.

The side wall of the tubular member 20 is of approximately the same thickness throughout with the exception of an internal flange 22 adjacent the lower end of the lower reduced portion of the member and the fact that the side wall of the upper unthreaded portion is slightly thinner than that of the lower threaded portion. The construction provides an internal shoulder 23 on the member 20 of the body assembly, upon which shoulder the weight assembly, designated generally as 25, rests and upon which shoulder it is adapted to rock when the body is tilted a predetermined amount.

The weight assembly 25 shown comprises a non-metallic base member 26 preferably made of a plastic similar to the members 20 and 21, and a lead part 27 cast to the base member. The upper part of the base member 26 is of reduced size and is provided with an external groove 30 adjacent the top forming an undercut into which a part of the lead 27 flows or extends to securely lock the parts together. A groove 31 in the upper face of the lower part of the base member also helps to secure the base member 26 to the weight proper 25.

The lower end or the base of the weight assembly 25 is circular and of slightly less diameter than the interior diameter of the member 20 adjacent thereto; however, the clearance between the weight assembly and the wall of the member 20 adjacent thereto increases considerably toward the top of the weight assembly. In the embodiment shown, this is produced by making the weight assembly frusto-conical in shape. The construction just described limits the lateral shifting of the weight assembly in the vent passage through the body assembly and allows the weight assembly to rock on the shoulder 23 and the side wall of the member 20 adjacent thereto when the body assembly is tilted, as is clearly shown in Fig. 4.

A valve 35 formed integral with a valve stem 36 operatively connected to the weight assembly 25 is actuated by the weight assembly 25, rocking upon the shoulder 23, to close the vent passage through the body assembly. According to the provisions of the present invention, the seat engaging portion of the valve 35 is frusto-conical in shape and engages the lower face of a soft rubber or rubber-like grommet 37 as a valve seat, with the valve stem extending up through a central aperture in the grommet. The soft rubber-like seat may be provided in any suitable manner other than that shown, as by a rubber washer cemented to the lower end of the plug proper or member 20, or a rubber cylinder cemented in the lower end of the passage through the body assembly. In operation, the valve when closed frequently is exposed or subject to pressure developed by the evolution of gases within the cell and it will be observed that this construction affords a valve of minimum effective area for the internal pressure to act against for any given size of aperture in the valve seat or grommet 37, so that the valve may be opened more easily. The fact that the valve seat is soft rubber or the like, and the seating portion of the valve frusto-conical, provides a wiping action as the valve closes, which not only provides for a better centering of the valve on its seat and tends to remove any particles of active material or other dirt present but otherwise tends to secure a better seating of the valve. Alternatively any suitable valve and valve seat construction may be employed so long as the above feature of the preferred construction shown is maintained. The grommet 37 shown forms a part of the body assembly and is retained in the lower end of the member 20 by the flange 22, previously referred to.

The upper end of the valve stem 36, which is preferably made of the same material as the base 26, is provided with an enlarged head 40, the lower surface of which is of spherical, segmental shape and engages a spherical, segmental socket 41 formed at the lower end of an aperture 42 in the center of the base member 26. As shown, the aperture 42 extends through the base member proper and its upper end is closed as by a disk 43 fixed to and forming a part of the base member 26. Alternatively, the base member may be formed in one piece. A slight clearance is provided between the head 40 on the valve stem 36 and the disk 43 for providing controlled, predetermined, relative movement between the head 40 and, in turn, the valve 35 and the weight assembly. The valve stem shown is rigid, and the provision of limited clearance or lost motion between the weight assembly and the valve causes the weight assembly to tap or knock the valve open when the battery is righted if it tends to stick or remain closed incident to any gas pressure within the cell. Alternatively, the valve stem may be semi-rigid.

The upper end of the opening or vent passage through the member 20 is closed except for a relatively small aperture 45 in the center of the member 21, the inner part of which is formed in an inwardly projecting part or boss 46 on the member 21 causing the aperture 45 to open into the interior of the member 20 at a point spaced from the side and top walls thereof. In order to permit all of any electrolyte trapped above the base of the weight assembly when the device is righted after having been tilted or inverted, the side wall of the member 20, including the shoulder 23 adjacent the lower end of the weight assembly, is provided with a plurality of grooves 47 which maintain the vent passage around the weight assembly open at all times. As shown, the grooves 47 are formed by slightly raised portions 48 on the interior of the member 20. Alternatively, grooves could be formed in the base of the weight assembly. The inner part of the shoulder 23 is rounded off, the upper end of the grommet 37 is made funnel-shaped, as indicated at 50, and the interior of the body assembly is otherwise so formed as to facilitate return of all the electrolyte to the battery cell.

From the foregoing description of the preferred embodiment of the invention shown, it will be apparent that the objects heretofore enumerated and others have been accomplished, and that there has been provided a novel and improved, non-spill vent for devices, such as storage batteries, etc., which is simple in construction, inexpensive to manufacture, and which is so constructed that the valve can be opened, after having been temporarily closed, with minimum force. While the preferred embodiment has been described in considerable detail, the invention is not limited to the construction shown and it is my invention to hereby cover all adaptations, uses and modifications thereof which come within the spirit and scope of the appended claims.

Having thus described my invention, what I claim is:

1. In a vent structure for a storage battery containing free liquid electrolyte, a rigid acid-resistant body having a vent passage therethrough comprising two generally aligned tubular-like portions, an internal annular shoulder on said body intermediate said tubular-like portions of said vent passage, a tiltable weight within one of said portions of said vent passage and adapted to be supported on said shoulder, said weight having an annular base adapted to rest upon said shoulder and said portion of said vent passage adjacent to the base of said weight being generally circular and of slightly greater diameter than the diameter of the base of said weight and the clearance between the side walls of said vent passage adjacent to said weight and said weight being greater above the base of said weight than adjacent thereto, a soft rubber-like valve seat in the form of a tubular rubber member located in the second of said tubular-like portions of said vent passage, interlocking means between said body and said valve seat securing said valve seat in said second of said tubular-like portions of said vent passage, said valve seat having an opening therethrough, a valve stem projecting through said opening in said valve seat and being freely slidable therein, means for pivotally connecting one end of said valve stem to said weight for universal angular movement, and a valve connected to said valve stem adjacent to the other end thereof and engageable with said valve seat for closing and opening said vent passage through said body upon said weight rocking on said shoulder incident to said body being tilted.

2. In a vent structure for a storage battery containing free liquid electrolyte, a rigid acid-resistant body having a vent passage therethrough comprising two generally aligned tubular-like portions, an internal annular shoulder on said body intermediate said tubular-like portions of said vent passage, a tiltable weight within one of said portions of said vent passage and adapted to be supported on said shoulder, said weight having an annular base adapted to rest upon said shoulder and said portion of said vent passage adjacent to the base of said weight being generally circular and of slightly greater diameter than the diameter of the base of said weight and the clearance between the side walls of said vent passage adjacent to said weight and said weight being greater above the base of said weight than adjacent thereto, a soft rubber-like valve seat in the form of a tubular rubber member located in the second of said tubular-like portions of said passage, interlocking means between said body and said valve seat securing said valve seat in said second of said tubular-like portions of said vent passage, said valve seat having an opening therethrough, a valve stem projecting through said opening in said valve seat and being freely slidable therein, means for pivotally connecting one end of said valve stem to said weight for universal angular movement, and a valve connected to said valve stem adjacent to the other end thereof, said valve having a frusto-conical portion engageable with said valve seat for closing and opening said vent passage through said body upon said weight rocking on said shoulder incident to said body being tilted.

CLARENCE H. ENDRESS.

REFERENCES CITED

The following references are of record in the file of this patent:

UNITED STATES PATENTS

| Number | Name | Date |
|---|---|---|
| 654,771 | Van Vechten | July 31, 1900 |
| 710,129 | Watrous | Sept. 30, 1902 |
| 1,463,169 | Lavinger | July 31, 1923 |
| 1,608,424 | Putnam | Nov. 23, 1926 |
| 1,619,033 | Perrenot | Mar. 1, 1927 |
| 1,711,234 | Langdon | Apr. 30, 1929 |
| 1,992,151 | Woodbridge | Feb. 19, 1935 |
| 2,124,455 | Hopkins | July 19, 1938 |
| 2,262,224 | Daniels | Nov. 11, 1941 |
| 2,262,746 | Allen | Nov. 18, 1941 |
| 2,306,974 | Oestermeyer | Dec. 29, 1942 |
| 2,344,657 | Thiel | Mar. 21, 1944 |
| 2,355,288 | Fritzinger | Aug. 8, 1944 |
| 2,405,736 | Daily | Aug. 13, 1946 |
| 2,480,850 | Goldberg | Sept. 6, 1949 |